United States Patent
Hsieh

(10) Patent No.: US 12,028,438 B2
(45) Date of Patent: Jul. 2, 2024

(54) ELECTRONIC DEVICE THAT ADJUSTS LOCAL CLOCK ACCORDING TO CLOCK INFORMATION OF ANOTHER ELECTRONIC DEVICE AND ASSOCIATED COMPUTER SYSTEM

(71) Applicant: Airoha Technology Corp., Hsinchu (TW)

(72) Inventor: Ming-Yi Hsieh, Hsinchu County (TW)

(73) Assignee: Airoha Technology Corp., Hsinchu (TW)

( * ) Notice: Subject to any disclaimer, the term of this patent is extended or adjusted under 35 U.S.C. 154(b) by 86 days.

(21) Appl. No.: 17/848,399

(22) Filed: Jun. 24, 2022

(65) Prior Publication Data
US 2023/0421347 A1 Dec. 28, 2023

(51) Int. Cl.
*G06F 1/12* (2006.01)
*H04L 7/00* (2006.01)

(52) U.S. Cl.
CPC ............... *H04L 7/0079* (2013.01); *G06F 1/12* (2013.01)

(58) Field of Classification Search
CPC ................................. H04L 7/0079; G06F 1/12
See application file for complete search history.

(56) References Cited

U.S. PATENT DOCUMENTS

| 7,046,057 | B1 * | 5/2006 | Culler ..................... H03L 7/081 375/376 |
| 8,102,836 | B2 | 1/2012 | Jerlhagen |
| 11,817,870 | B2 * | 11/2023 | Langer .................... H03L 7/181 |
| 2014/0143582 | A1 * | 5/2014 | Kindred ............. H04W 56/005 713/400 |
| 2020/0137699 | A1 * | 4/2020 | Girardier ............ H04W 56/001 |

FOREIGN PATENT DOCUMENTS

TW 200842598 11/2008

\* cited by examiner

*Primary Examiner* — Zahid Choudhury
(74) *Attorney, Agent, or Firm* — Winston Hsu

(57) ABSTRACT

An electronic device includes a receiver circuit, a clock generator circuit, and a clock control circuit. The receiver circuit receives first clock information associated with a first clock of another electronic device. The clock generator circuit generates a second clock for the electronic device. The clock control circuit obtains second clock information associated with the second clock, generates a clock control signal according to the first clock information and the second clock information, and outputs the clock control signal to the clock generator circuit, where the clock generator circuit adjusts the second clock in response to the clock control signal.

19 Claims, 4 Drawing Sheets

ELECTRONIC DEVICE THAT ADJUSTS LOCAL CLOCK ACCORDING TO CLOCK INFORMATION OF ANOTHER ELECTRONIC DEVICE AND ASSOCIATED COMPUTER SYSTEM

BACKGROUND OF THE INVENTION

1. Field of the Invention

The present invention relates to dealing with frequency deviation between clocks, and more particularly, to an electronic device that adjusts a local clock according to clock information of another electronic device and an associated computer system.

2. Description of the Prior Art

Wireless communication protocols, such as the Bluetooth protocol, enable a variety of types of data streams to be provided by source devices to sink devices in a wireless fashion. For example, audio data may be streamed by the source devices to the sink devices. The audio format may be defined by several parameters, including a sampling rate/sampling frequency (e.g., 48 kHz or 96 kHz), a sample depth (e.g., 16 bits or 24 bits), and the number of channels (e.g., mono or stereo). With regard to full-band audio with a sampling rate being 48 kHz, each audio sample should be exactly played for 20.8333 . . . microsecond ($\mu s$). However, a real crystal oscillator may have 5-15 ppm (parts per million) deviation. For example, playback of 48000 audio samples in 48 kHz may be done in a period from 0.999985 s (i.e., 48000÷(48 kHz×(1+15 ppm))) to 1.000015 s (i.e., 48000÷(48 kHz×(1-15 ppm))), where ±15 $\mu s$ per second is contributed by crystal oscillator's frequency deviation that may be caused by temperature variation and/or inherent physical characteristics. Ideally, one audio sample in 48 kHz should be played within 20.83 $\mu s$. If the frequency deviation is fixed 15 ppm, there is deviation of 2 audio samples after about 2.77 s (i.e., 2÷48 kHz÷15 ppm). If the frequency deviation is fixed 5 ppm, there is deviation of 2 audio samples after about 8.33 s (i.e., 2÷48 kHz÷5 ppm). The audio devices may include a source device and a sink device, each having a crystal oscillator with its own frequency deviation property. Due to frequency deviation between crystal oscillators at the source device and the sink device, the crystal oscillator at the sink device may not be synchronized with the crystal oscillator at the source device. To address the frequency deviation in audio playback, one conventional solution uses a resampler for performing sampling rate conversion (SRC) upon the audio data. For example, one resampler may be implemented in only one of the source device and the sink device. For another example, resamples may be implemented in both of the source device and the sink device. However, regarding a hardware-based SRC design, it has 61 ppm deviation which is larger than 5-15 ppm deviation of the crystal oscillator and may therefore lead to overcorrection and cause instable audio deviation, and further has extra power consumption and causes extra latency of about 1.54 millisecond (ms) in the audio path. Regarding a software-based SRC design, it has 500 ppm deviation which is much larger than 5-15 ppm deviation of the crystal oscillator and causes instable audio deviation, and further takes extra instructions and has extra power consumption.

Thus, there is a need for an innovative clock synchronization design that can reduce frequency deviation between a clock of a source device and a clock of a sink device in the absence of resamples in the source device and the sink device.

SUMMARY OF THE INVENTION

One of the objectives of the claimed invention is to provide an electronic device that adjusts a local clock according to clock information of another electronic device and an associated computer system.

According to a first aspect of the present invention, an exemplary electronic device is disclosed. The exemplary electronic device includes a receiver circuit, a clock generator circuit, and a clock control circuit. The receiver circuit is arranged to receive first clock information associated with a first clock of another electronic device. The clock generator circuit is arranged to generate a second clock for the electronic device. The clock control circuit is arranged to obtain second clock information associated with the second clock, generate a clock control signal according to the first clock information and the second clock information, and output the clock control signal to the clock generator circuit. The clock generator circuit is further arranged to adjust the second clock in response to the clock control signal.

According to a second aspect of the present invention, an exemplary computer system is disclosed. The exemplary computer system includes a source device and a link device. The source device includes a transmitter circuit that is arranged to transmit audio data and first clock information associated with a first clock utilized by the source device. The sink device includes a receiver circuit, a clock generator circuit, and a clock control circuit. The receiver circuit is arranged to receive the audio data and the first clock information through a link between the source device and the sink device. The clock generator circuit is arranged to generate a second clock for the sink device. The clock control circuit is arranged to obtain second clock information associated with the second clock, generate a clock control signal according to the first clock information and the second clock information, and output the clock control signal to the clock generator circuit. The clock generator circuit is further arranged to adjust the second clock in response to the clock control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
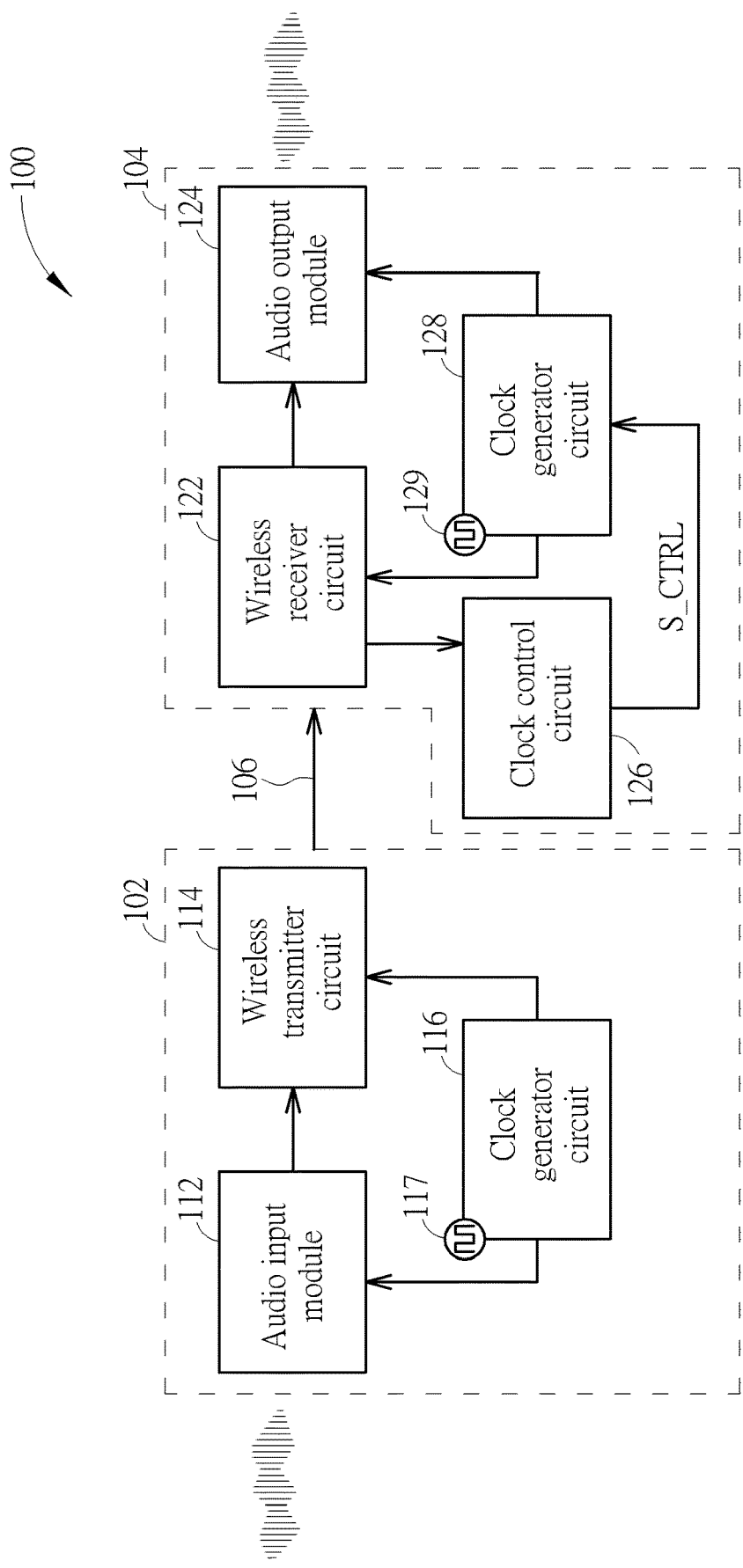
FIG. 1 is a diagram illustrating a first computer system according to an embodiment of the present invention.

FIG. 1 is a diagram illustrating a first computer system according to an embodiment of the present invention. The computer system (e.g., an audio playback system) 100 includes a plurality of electronic devices (e.g., a source device 102 and a sink device 104) that communicate with each other through a link 106. For example, regarding an audio application, the source device 102 may be an audio source device such as a music player, a mobile phone, laptop or desktop computers, cellular phones, smart phones, wireless modems, e-readers, tablet devices, or gaming systems, and the sink device 104 may be an earphone, a headset, speakers, home audio system, or audio system in a vehicle. However, this is for illustrative purposes only, and is not meant to be a limitation of the present invention. Any electronic device using the proposed semi-synchronization scheme for adjusting the frequency of a local clock falls within the scope of the present invention.

In this embodiment, the link 106 is a wireless link such as a Bluetooth (BT) link or a wireless fidelity (Wi-Fi) link. The source device 102 includes an audio input module 112 and a wireless transmitter circuit 114, both operating according to a system clock 117 that is a local clock of the source device 102 and generated from a clock generator circuit 116. For example, the clock generator circuit 116 may be implemented by a crystal oscillator. The audio input module 112 may include a digital processing circuit arranged to provide audio data for playback at the sink device 104. The wireless transmitter circuit 114 is arranged to transmit the audio data output by the audio input module 112 to the sink device 104 through the link 106 established between the source device 102 and the sink device 104.

The sink device 104 includes a wireless receiver circuit 122 and an audio output module 124, both operating according to a system clock 129 that is a local clock of the sink device 104 and generated from a clock generator circuit 128. For example, the clock generator circuit 128 may be implemented by a crystal oscillator. The wireless receiver circuit 122 is arranged to receive the audio data from the source device 102 through the link 106 established between the source device 102 and the sink device 104. The audio output module 124 may include an audio digital-to-analog converter (DAC) and speaker unit (s) for playback of the audio data provided from the source device 102. In this embodiment, the sink device 104 further includes a clock control circuit 126 arranged to deal with clock synchronization achieved through the proposed semi-sync clock (SSC) scheme.

In accordance with the proposed SSC scheme, the wireless receiver circuit 122 receives first clock information associated with the system clock 117 of the source device 102; the clock control circuit 126 obtains second clock information associated with the system clock 129 of the sink device 104, generates a clock control signal S_CTRL according to the first clock information and the second clock information, and outputs the clock control signal S_CTRL to the clock generator circuit 128; and the clock generator circuit 128 adjusts the frequency of the system clock 129 in response to the clock control signal S_CTRL.

Figure 2:
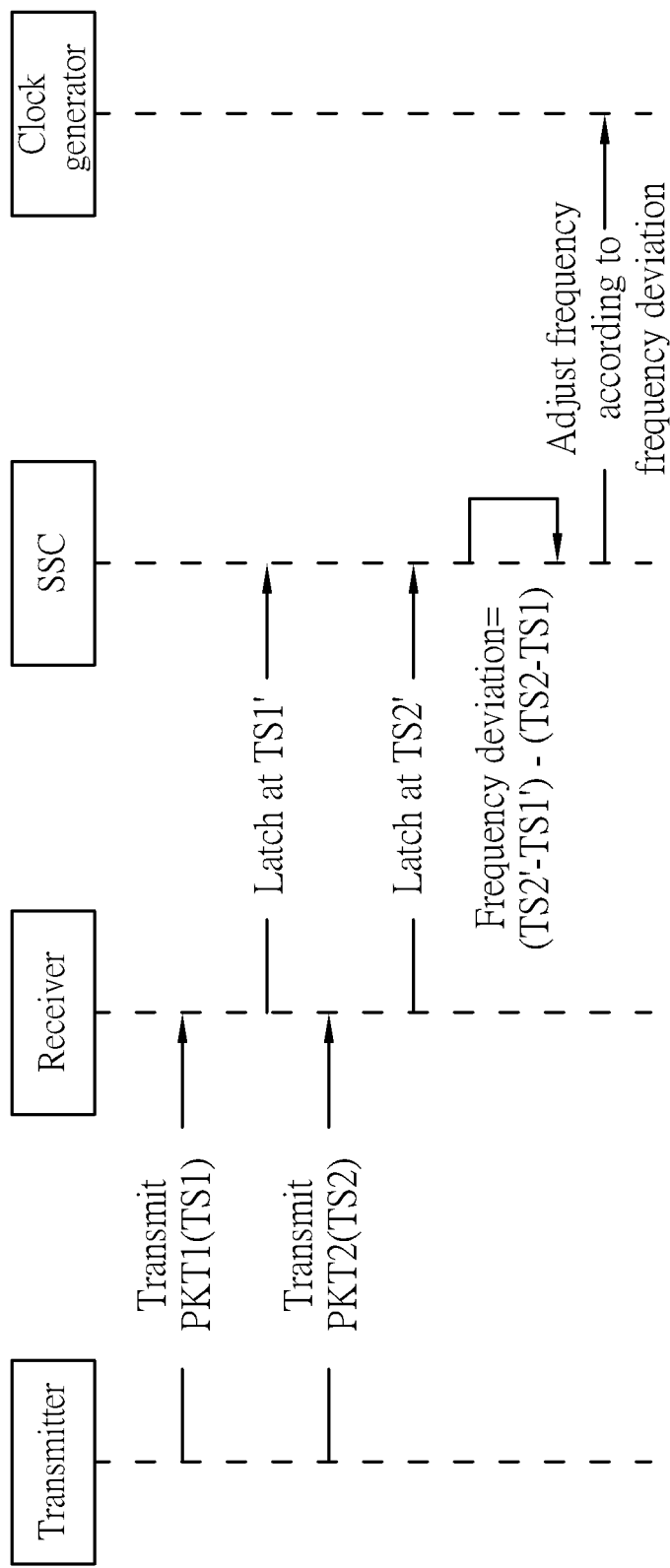
FIG. 2 is a sequence diagram of a proposed semi-sync clock scheme employed by the computer system shown in FIG. 1 according to an embodiment of the present invention.

Please refer to FIG. 2 in conjunction with FIG. 1. FIG. 2 is a sequence diagram of the proposed SSC scheme employed by the computer system 100 shown in FIG. 1 according to an embodiment of the present invention. In this embodiment, the first clock information obtained from the remote source device 102 may include clock timestamp information, and the second clock information obtained by the local sink device 104 may include clock timestamp information. A clock timestamp of the system clock 117 may be a value indicative of a system time point of the source device 102. A clock timestamp of the system clock 129 may be a value indicative of a system time point of the sink device 104. As shown in FIG. 2, the wireless transmitter circuit 114 transmits a first packet PKT1 which carries a clock timestamp TS1 that is a value of the system clock 117 at the time the first packet PKT1 is transmitted by the source device 102. After the first packet PKT1 is successfully received by the sink device 104, the sink device 104 (particularly, clock control circuit 126 of sink device 104) obtains a clock timestamp TS1' of the system clock 129. Specifically, the clock timestamp TS1' is a value of the system clock 129 latched at the time the first packet PKT1 is received by the sink device 104.

Furthermore, the wireless transmitter circuit 114 transmits a second packet PKT2 which carries a clock timestamp TS2 that is a value of the system clock 117 at the time the second packet PKT2 is transmitted by the source device 102. After the second packet PKT2 is successfully received by the sink device 104, the sink device 104 (particularly, clock control circuit 126 of sink device 104) obtains a clock timestamp TS2' of the system clock 129. Specifically, the clock timestamp TS2' is a value of the system clock 129 latched at the time the second packet PKT2 is received by the sink device 104.

After the first clock information (which may include clock timestamps TS1 and TS2) and the second clock information (which may include clock timestamps TS1' and TS2') are available, the clock control circuit 126 may estimate the frequency deviation between a local clock of a wireless master device (i.e., system clock 117 of source device 102) and a local clock of a wireless slave device (i.e., system clock 129 of sink device 104) according to the first clock information and the second clock information. For example, in a case where the wireless transmitter circuit 114 is a BT transmitter circuit and the wireless receiver circuit 122 is a BT receiver circuit, the frequency deviation between system clocks 117 and 129 may be estimated by variation of the BT offset that may be derived from the first clock information and the second clock information. Communication between the wireless master device and the wireless slave device uses a master-slave mechanism. As such, timing difference between two times transmission of the wireless master devices is supposed to be the same as that between two times reception of the wireless slave device. If the timing differences are different from each other, a difference therebetween can be used to evaluate the frequency deviation. For example, the frequency deviation may be computed by using the following formula.

$$\text{Frequency deviation} = (TS2' - TS1') - (TS2 - TS1) \quad (1)$$

After the frequency deviation is obtained by the clock control circuit 126, the clock control circuit 126 refers to the frequency deviation to set the clock control signal S_CTRL, to adjust the frequency of the system clock 129 for synchronizing a local clock of a wireless slave device (i.e., system clock 129 of sink device 104) with a local clock of a wireless master device (i.e., system clock 117 of source device 102). It should be noted that the proposed SSC scheme may work without modification in the source side. That is, synchronization between system clocks 117 and 129 may be achieved by solely adjusting the frequency of the sink-side system clock 129.

With the help of the proposed SSC scheme, one or both of the source device 102 and the sink device 104 are not required to have a sampling rate conversion (SRC) circuit used to process the audio data for resolving the frequency deviation issue. For example, the sink device 104 is not equipped with an SRC circuit when the computer system 100 is employed by some audio applications. For another example, each of the source device 102 and the sink device 104 is not equipped with an SRC circuit when the computer system 100 is employed by other audio applications. Since at least one of the source device 102 and the sink device 104 can be implemented by a resampler-free device, the proposed solution does not suffer from side effects of using resamplers to resolve frequency deviation in an audio application. In addition, the proposed SSC scheme is suitable for a low-power application due to the fact that no extra components for implementing an SRC design are needed to compensate for the clock drift.

Figure 3:
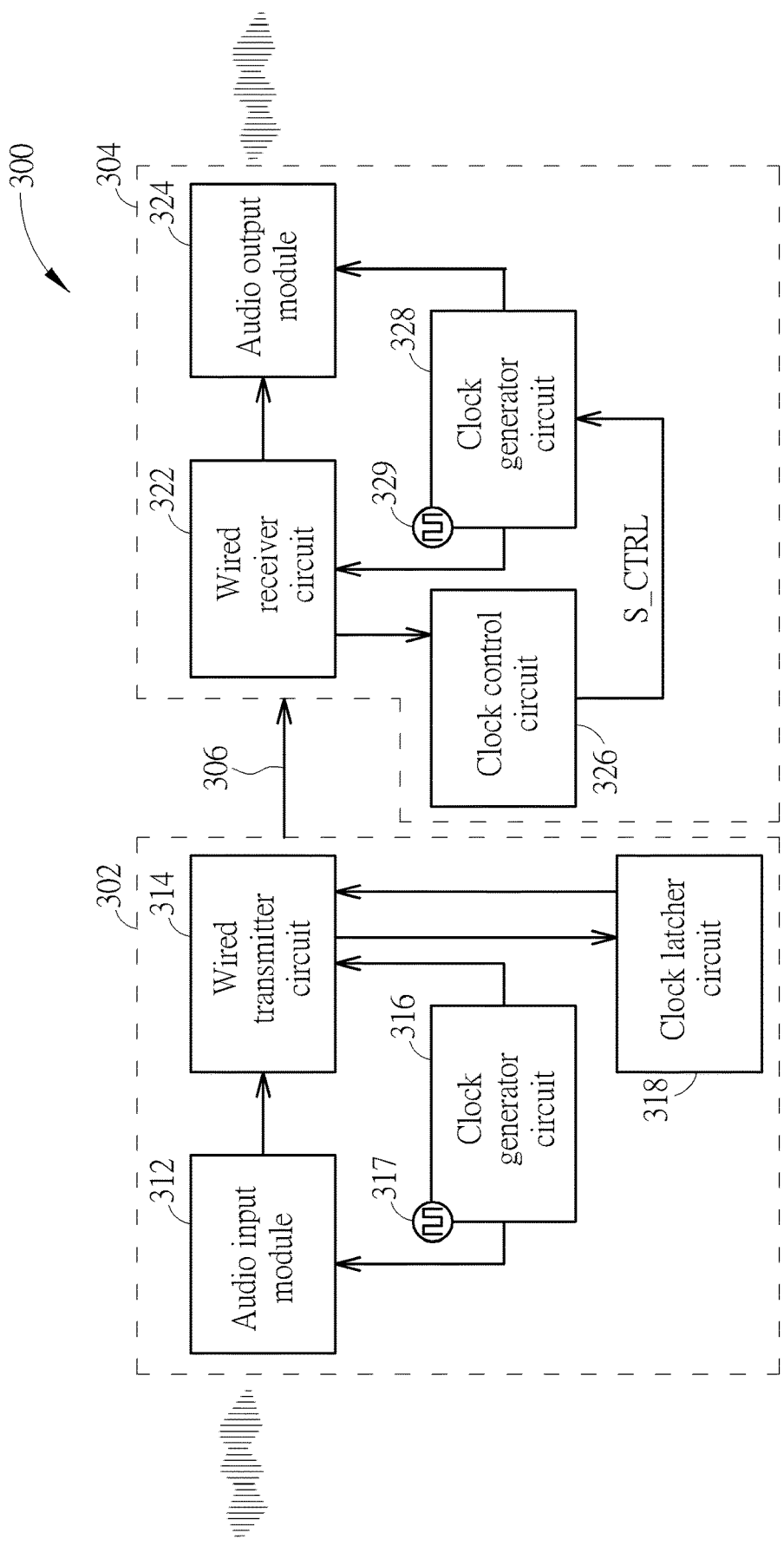
FIG. 3 is a diagram illustrating a second computer system according to an embodiment of the present invention.

FIG. 3 is a diagram illustrating a second computer system according to an embodiment of the present invention. The computer system (e.g., an audio playback system) 300 includes a plurality of electronic devices (e.g., a source device 302 and a sink device 304) that communicate with each other through a link 306. For example, regarding an audio application, the source device 302 may be an audio source device such as a music player, a mobile phone, laptop or desktop computers, cellular phones, smart phones, wireless modems, e-readers, tablet devices, or gaming systems, and the sink device 304 may be an earphone, a headset, speakers, home audio system, or audio system in a vehicle. However, this is for illustrative purposes only, and is not meant to be a limitation of the present invention. Any electronic device using the proposed semi-synchronization scheme for adjusting the frequency of a local clock falls within the scope of the present invention.

In this embodiment, the link 306 is a wired link such as a universal asynchronous receiver/transmitter (UART) link or a general-purpose input/output (GPIO) link. The source device 302 includes an audio input module 312 and a wired transmitter circuit 314, both operating according to a system clock 317 that is a local clock of the source device 302 and generated from a clock generator circuit 316. For example, the clock generator circuit 316 may be implemented by a crystal oscillator. The audio input module 312 may include a digital processing circuit arranged to provide audio data for playback at the sink device 304. The wired transmitter circuit 314 is arranged to transmit the audio data output by the audio input module 312 to the sink device 304 through the link 306 connected between the source device 302 and the sink device 304. In this embodiment, the source device 302 further includes a clock latcher circuit 318 arranged to obtain first clock information (e.g., clock duration information) associated with the system clock 317, and provides the first clock information (e.g., clock duration information) to the wired transmitter circuit 314 for transmission. For example, the clock latcher circuit 318 provides a clock duration by latching the system clock 317 periodically. The clock latcher circuit 318 presets a specific count value, for example, 500 k. The clock latcher circuit 318 calculates a time interval counting from a count value of 0 to the specific count value of 500 k as the clock duration.

The sink device 304 includes a wired receiver circuit 322 and an audio output module 324, both operating according to a system clock 329 that is a local clock of the sink device 304 and generated from a clock generator circuit 328. For example, the clock generator circuit 328 may be implemented by a crystal oscillator. The wired receiver circuit 322 is arranged to receive the audio data from the source device 302 through the link 306 connected between the source device 302 and the sink device 304. The audio output module 324 may include an audio DAC and speaker unit(s) for playback of the audio data provided from the source device 302. In this embodiment, the sink device 304 further includes a clock control circuit 326 arranged to deal with clock synchronization achieved through the proposed SSC scheme.

In accordance with the proposed SSC scheme, the wired receiver circuit 322 receives first clock information associated with the system clock 317 of the source device 302; the clock control circuit 326 obtains second clock information associated with the system clock 329 of the sink device 304, generates a clock control signal S_CTRL according to the first clock information and the second clock information, and outputs the clock control signal S_CTRL to the clock generator circuit 328; and the clock generator circuit 328 adjusts the frequency of the system clock 329 in response to the clock control signal S_CTRL.

Figure 4:
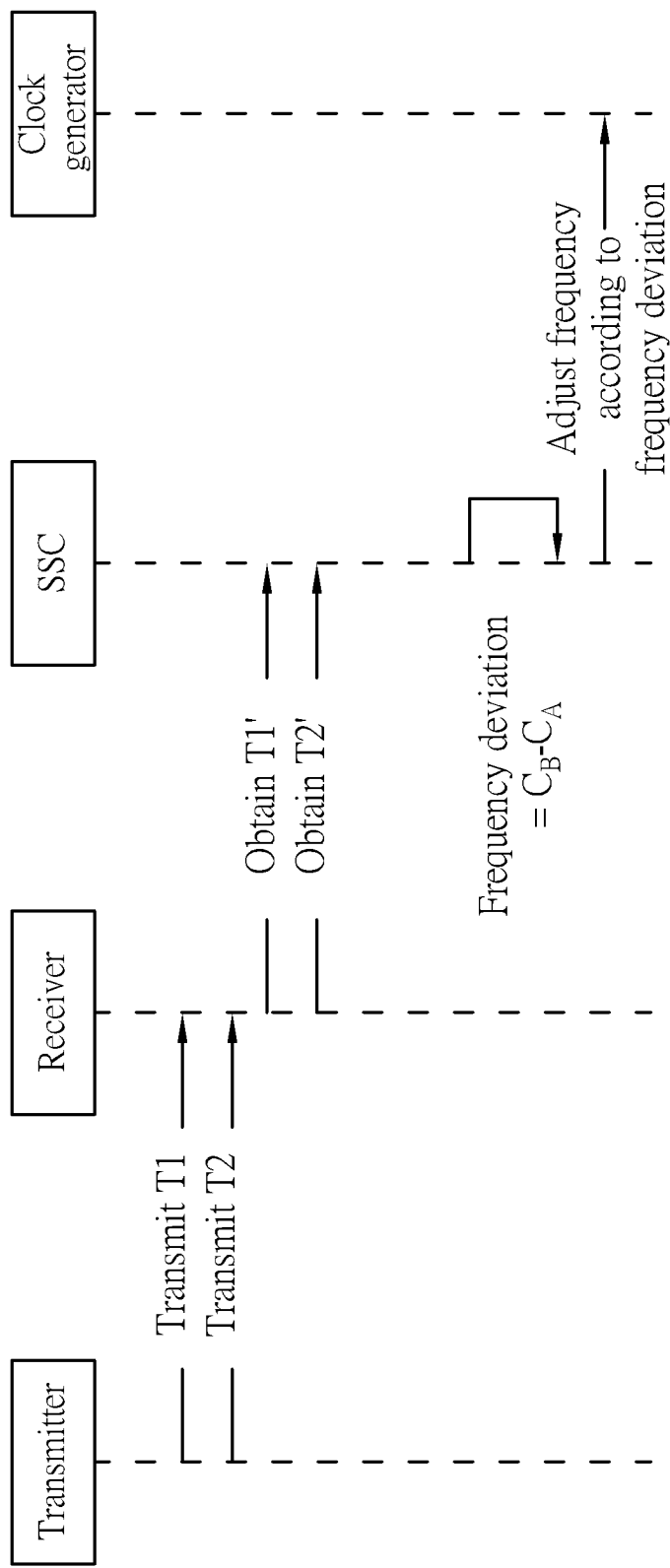
FIG. 4 is a sequence diagram of a proposed semi-syn clock scheme employed by the computer system shown in FIG. 3 according to an embodiment of the present invention.

Please refer to FIG. 3 in conjunction with FIG. 4. FIG. 4 is a sequence diagram of the proposed SSC scheme employed by the computer system 300 shown in FIG. 3 according to an embodiment of the present invention. In this embodiment, the first clock information obtained from the remote source device 302 may include clock duration information, and the second clock information obtained by the local sink device 304 may include clock duration information. For example, the clock duration information obtained from the remote source device 302 may include a start timestamp value T1 and an end timestamp value T2 of a clock duration $C_A$ measured by the clock latcher circuit 318 using the system clock 317, and the clock duration information obtained by the local sink device 304 may include a start timestamp value T1' and an end timestamp value T2' of a clock duration $C_B$ measured by the clock control circuit 326 using the system clock 329. As shown in FIG. 4, the wired transmitter circuit 314 transmits the start timestamp value T1 and the end timestamp value T2 of the clock duration $C_A$. After the start timestamp value T1 and the end timestamp value T2 of the clock duration $C_A$ are successfully received by the sink device 304, the sink device 304 (particularly, clock control circuit 326 of sink device 304) obtains the start timestamp value T1' and the end timestamp value T2' of the clock duration $C_B$. For example, the clock control circuit 326 may have a sink-side clock latcher circuit (not shown) with a function similar to that of the source-side clock latcher circuit 318.

After the first clock information (which may include information of the clock duration $C_A$, where $C_A = T2-T1$) and the second clock information (which may include information of the clock duration $C_B$, where $C_B = T2'-T1'$) are available, the clock control circuit 326 may estimate the frequency deviation between a local clock of a wired master device (i.e., system clock 317 of source device 302) and a local clock of a wired slave device (i.e., system clock 329 of sink device 304) according to the first clock information and the second clock information. Specific count values at the wired master device and at the wired slave device are preset to be the same. As such, the clock duration $C_A$ of the wired master device is supposed to be the same as the clock duration $C_B$ of the wired slave device. If the clock durations are different from each other, a difference therebetween can be used to evaluate the frequency deviation. For example, the frequency deviation may be computed by using the following formula.

$$\text{Frequency deviation}=C_B-C_A \qquad (2)$$

After the frequency deviation is obtained by the clock control circuit 326, the clock control circuit 326 refers to the frequency deviation to set the clock control signal S_CTRL, to adjust the frequency of the system clock 329 for synchronizing a local clock of a wired slave device (i.e., system clock 329 of sink device 304) with a local clock of a wired master device (i.e., system clock 317 of source device 302). It should be noted that the proposed SSC scheme may work with the help of a clock latcher circuit in the source side, and may work without system clock adjustment in the source side. That is, synchronization between system clocks 317 and 329 may be achieved by solely adjusting the frequency of the sink-side system clock 329.

With the help of the proposed SSC scheme, one or both of the source device 302 and the sink device 304 are not required to have a sampling rate conversion (SRC) circuit used to process the audio data for resolving the frequency deviation issue. For example, the sink device 304 is not equipped with an SRC circuit when the computer system 300 is employed by some audio applications. For another example, each of the source device 302 and the sink device 304 is not equipped with an SRC circuit when the computer system 300 is employed by other audio applications. Since at least one of the source device 302 and the sink device 304 can be implemented by resampler-free devices, the proposed solution does not suffer from side effects of using resamplers to resolve frequency deviation in an audio application. In addition, the proposed SSC scheme is suitable for a low-power application due to the fact that no extra components for implementing an SRC design are needed to compensate for the clock drift.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
   a receiver circuit, arranged to receive first clock information associated with a first clock of another electronic device, wherein the first clock information received by the receiver circuit is not a clock signal transmitted from the another electronic device;
   a clock generator circuit, arranged to generate a second clock for the electronic device; and
   a clock control circuit, arranged to obtain second clock information associated with the second clock, generate a clock control signal according to the first clock information and the second clock information, and output the clock control signal to the clock generator circuit, wherein the clock generator circuit is further arranged to adjust the second clock in response to the clock control signal.

2. The electronic device of claim 1, wherein the clock control circuit is arranged to estimate frequency deviation between the second clock and the first clock according to the first clock information and the second clock information, and generate the clock control signal according to the frequency deviation.

3. The electronic device of claim 1, wherein the receiver circuit is arranged to receive the first clock information transmitted from another electronic device at which the first clock is generated.

4. The electronic device of claim 1, wherein the receiver circuit is a wireless receiver circuit.

5. The electronic device of claim 4, wherein the wireless receiver circuit is a Bluetooth receiver circuit.

6. The electronic device of claim 1, wherein the receiver circuit is a wired receiver circuit.

7. The electronic device of claim 1, wherein the first clock information comprises clock timestamp information, and the second clock information comprises clock timestamp information.

8. The electronic device of claim 1, wherein the first clock information comprises clock duration information, and the second clock information comprises clock duration information.

9. The electronic device of claim 1, wherein the electronic device is not equipped with a sampling rate conversion (SRC) circuit.

10. A computer system comprising:
    a source device, comprising:
       a transmitter circuit, arranged to transmit audio data and first clock information associated with a first clock utilized by the source device; and
    a sink device, comprising:
       a receiver circuit, arranged to receive the audio data and the first clock information through a link between the source device and the sink device, wherein the first clock information received by the receiver circuit is not a clock signal transmitted from the transmitter circuit;
       a clock generator circuit, arranged to generate a second clock for the sink device; and
       a clock control circuit, arranged to obtain second clock information associated with the second clock, generate a clock control signal according to the first clock information and the second clock information, and output the clock control signal to the clock generator circuit, wherein the clock generator circuit is further arranged to adjust the second clock in response to the clock control signal.

11. The computer system of claim 10, wherein the clock control circuit is arranged to estimate frequency deviation between the second clock and the first clock according to the first clock information and the second clock information, and generate the clock control signal according to the frequency deviation.

12. The computer system of claim 10, wherein the transmitter circuit is a wireless transmitter circuit, and the receiver circuit is a wireless receiver circuit.

13. The computer system of claim 12, wherein the wireless transmitter circuit is a Bluetooth transmitter circuit, and the wireless receiver circuit is a Bluetooth receiver circuit.

14. The computer system of claim 10, wherein the transmitter circuit is a wired transmitter circuit, and the receiver circuit is a wired receiver circuit.

15. The computer system of claim 14, wherein the source device further comprises:
    a clock latcher circuit, arranged to provide the first clock information by latching the first clock periodically.

16. The computer system of claim 10, wherein the first clock information comprises clock timestamp information, and the second clock information comprises clock timestamp information.

17. The computer system of claim 10, wherein the first clock information comprises clock duration information, and the second clock information comprises clock duration information.

18. The computer system of claim 10, wherein the sink device is not equipped with a sampling rate conversion (SRC) circuit.

19. The computer system of claim 17, wherein the source device is not equipped with an SRC circuit.

* * * * *